United States Patent
Singhal

(10) Patent No.: US 11,074,646 B1
(45) Date of Patent: Jul. 27, 2021

(54) DYNAMICALLY SELECTING AN IMAGE FOR DISPLAY

(71) Applicant: Amazon Technologies, Inc., Seattle, WA (US)

(72) Inventor: Ashish Singhal, Bangalore (IN)

(73) Assignee: Amazon Technologies, Inc., Reno, NV (US)

( * ) Notice: Subject to any disclaimer, the term of this patent is extended or adjusted under 35 U.S.C. 154(b) by 401 days.

(21) Appl. No.: 15/846,954

(22) Filed: Dec. 19, 2017

Related U.S. Application Data

(62) Division of application No. 14/227,938, filed on Mar. 27, 2014, now Pat. No. 9,858,246.

(51) Int. Cl.
  *G06Q 30/06* (2012.01)
  *G06F 16/958* (2019.01)

(52) U.S. Cl.
  CPC ....... *G06Q 30/0643* (2013.01); *G06F 16/958* (2019.01); *G06Q 30/0641* (2013.01)

(58) Field of Classification Search
  CPC ......... G06F 17/211–218; G06F 17/243; G06F 17/248; G06F 3/04842; G06F 40/103; G06F 40/14; G06F 16/958; G06Q 30/0276; G06Q 30/0277; G06Q 30/06–0645; G06Q 30/08; G06Q 50/01
  See application file for complete search history.

(56) References Cited

U.S. PATENT DOCUMENTS

| | | | |
|---|---|---|---|
| 5,845,084 A | 12/1998 | Cordell et al. | |
| 7,194,680 B1 * | 3/2007 | Roy | G06F 40/174 715/205 |
| 7,337,392 B2 * | 2/2008 | Lue | G06F 16/9577 715/236 |
| 7,533,336 B2 | 5/2009 | Jaffe et al. | |
| 8,397,153 B1 * | 3/2013 | Lee | G06F 40/103 715/204 |
| 8,924,335 B1 | 12/2014 | Sachs et al. | |
| 2003/0135819 A1 * | 7/2003 | Lakhdhir | G06F 16/958 715/234 |

(Continued)

OTHER PUBLICATIONS

Macbeth, M.; Wong, R.K.; "2012 IEEE Ninth International Conference on Services Computing," IEEE, Jun. 1, 2012, pp. 423-430. (Year: 2012).*

(Continued)

*Primary Examiner* — Adam L Levine
(74) *Attorney, Agent, or Firm* — Kilpatrick Townsend & Stockton LLP

(57) ABSTRACT

Techniques for generating a web page and displaying an image in the web page may be provided. For example, the web page may include a placeholder for displaying the image. A service may be implemented to determine how many images and sizes of such images that should be made available for use in the placeholder. Further, the service may configure the web page to identify available images based on the determined number and sizes and to include a script for selecting one of the available images. Upon displaying the web page in a browser, the script may determine the size of the placeholder as displayed in the web page and may select one of the available images based on the determined placeholder size. The script may further cause the browser to download and display the selected image in the placeholder.

20 Claims, 9 Drawing Sheets

(56) References Cited

U.S. PATENT DOCUMENTS

2015/0095768 A1* 4/2015 Rimmer ................ G06F 40/103
715/238

OTHER PUBLICATIONS

U.S. Appl. No. 14/227,938, "Non-Final Office Action", dated Mar. 6, 2017, 22 pages.
U.S. Appl. No. 14/227,938, "Notice of Allowance", dated Sep. 11, 2017, 13 pages.
U.S. Appl. No. 14/227,938, "Restriction Requirement", dated Sep. 29, 2016, 9 pages.
U.S. Appl. No. 14/227,938, U.S. Patent Application, filed Mar. 27, 2014, Titled: Determining and Generating a Number of Images Meeting Particular Size Ranges and Selecting an Image for Display in a Placeholder of a Network Document.
Macbeth, M. and R.K. Wong, "A Middleware Service for Image Adjustment and Filtering for Small Screens," IEEE Ninth International Conference on Services Computing (Jun. 24-29, 2012), p. 423-430.

* cited by examiner

DYNAMICALLY SELECTING AN IMAGE FOR DISPLAY

CROSS REFERENCE TO RELATED APPLICATIONS

This application is a Division of U.S. patent application Ser. No. 14/227,938, filed Mar. 27, 2014, issued to U.S. Pat. No. 9,858,246 on Jan. 2, 2018, and entitled "DETERMINING AND GENERATING A NUMBER OF IMAGES MEETING PARTICULAR SIZE RANGES AND SELECTING AN IMAGE FOR DISPLAY IN A PLACEHOLDER OF A NETWORK DOCUMENT," the content of which is herein incorporated by reference in its entirety.

BACKGROUND

A user may operate a computing device to interact over a network with network content that may provide various functionalities. The user experience associated with the interaction may depend on multiple factors. These factors can include, for example, the type of the computing device, an application (e.g., a browser) executed on the computing device to interact with the network content, the bandwidth of the network, and the functionalities that the network content may provide. A good user experience may be achieved by supporting an increased number of computing device types, applications, and functionalities while also balancing bandwidth usage.

To illustrate, an electronic marketplace may enable merchants to provide information about items to consumers. This may include configuring a web site that may allow merchants to offer the items and the consumers to obtain the items. Information about an item can be presented at a web page of the web site and may include a description, an image, a recommendation, and a review of the item, among other information. Regardless of a computing device and an application that a consumer may operate, the electronic marketplace may allow the consumer to browse the web page and purchase the item. This interaction may also account for the network connection between the computing device and the web site.

BRIEF DESCRIPTION OF THE DRAWINGS

Various embodiments in accordance with the present disclosure will be described with reference to the drawings, in which.

DETAILED DESCRIPTION

Figure 1:
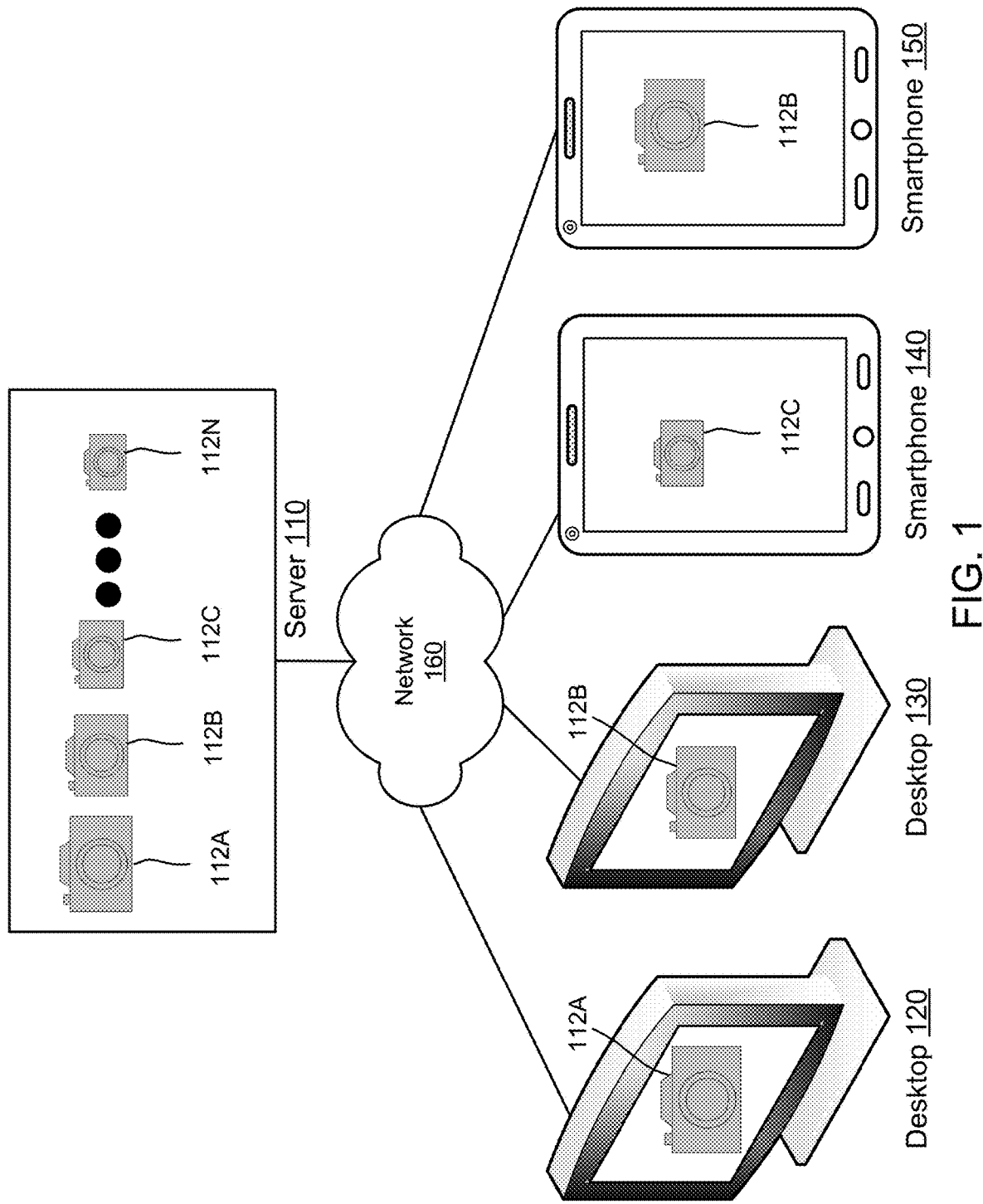
FIG. 1 illustrates an example computing environment for providing information to different types of computing devices and applications running on the computing devices, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing a user experience by, for example, improving responsiveness of information displayed at a user computing device while also reducing bandwidth usage for accessing the information over a network. For example, a service provider of an electronic marketplace may configure a web page to provide information about an item offered at the electronic marketplace. When displayed on the user computing device via a browser, the web page can present an image of the item. This image may be dynamically selected based on multiple factors including, for example, a size of a placeholder holding the image in the web page. To do so, the service provider may define a list of available images from the electronic marketplace in the code of the web page. In turn, the browser may determine the size of the placeholder, identify a best fitting image from the available images, obtain the image from the electronic marketplace, and display the image in the placeholder. Because the displayed image may be a best fitting image, obtaining the image from the electronic marketplace may use just enough bandwidth and, thus, may avoid bandwidth waste. Similarly, because the image may best fit in the placeholder, the responsiveness of the web page may be improved. Said differently, the displayed image may not be an image too large or too small (e.g., not necessitating skewing or stretching to fit in the placeholder). Instead, the displayed image may be an optimally sized image.

To illustrate, the service provide may store five differently sized images, or some other number, of a camera and may generate a web page for offering the camera for sale and/or for advertising the camera. In this example, the images may be of sizes: [100, 100], [200, 200], [300, 300], [400, 400], and [500,500], respectively, where in an [x, y] pair, "x" and "y" may indicate height and width in pixels, respectively. The web page may include a placeholder, such as a recommendation widget, for displaying an image of the camera. The code of the web page may list uniform record locators (URLs) of the images, may identify the corresponding sizes, and may include a script (e.g., a JavaScript or the like) for selecting and requesting a best fitting image. When a consumer runs a browser on a computing device to access the web page, the browser may start loading the web page and may execute the script. In turn, the script may determine a displayable size of the placeholder in the browser (e.g., [175, 175]) and may select an image from the five images. The selected image may have the next largest size in comparison to the placeholder size (e.g., the second image with a size of [200,200]). Further, the script may update the code of the web page to include an image element with the URL of the selected image as a source. This update may cause the browser to download the selected image from the electronic marketplace and to display the downloaded image in the placeholder.

In the interest of clarity of explanation, the embodiments herein are described in the context of dynamically providing images of an item available at an electronic marketplace. Nevertheless, the embodiments may similarly apply to other types of information, such as graphic objects, interactive components, or other information that may be displayed at a computing device. Also, the embodiments are not limited to information displayed on a web page from a web site of an electronic marketplace. Instead, the embodiments may similarly apply to information provided in any electronic document, including network documents and network content, which may be hosted on a network-based resource. These and other features are further described in the next figures.

Turning to FIG. 1, that figure illustrates an example computing environment for presenting information at computing devices. The computing environment may enable, for example, images to be dynamically selected and presented at the computing devices. More particularly, a server 110 may host a web site accessible to a plurality of computing devices over a network 160. The web site may include a collection of web pages. A web page may provide various types of information including, for example, an image of an item. The image may be displayed in a placeholder on the web page. To illustrate, the web page may include a placeholder, such as a recommendation widget, for displaying an image of a camera available at an electronic marketplace associated with the web site.

The computing devices may access the web site over the network 160 and may display various web pages from the web site. In the example shown in FIG. 1, four computing devices (desktop 120, desktop 130, smartphone 140, and smartphone 150) may display the web page associated with the camera. Because of the different types of computing devices (e.g., desktop computer, smartphones, and other types) and potential applications (e.g., different types of browsers), deciding what image of the camera to display in the placeholder on the web page may be challenging. Even if a same type of computing devices and a same type of applications were operated by users, this challenge may still exist. That may be because the size of the placeholder as displayed in the web page may vary across the computing devices. For example, while one user may expand a browser on a desktop to use the entire display space, another user operating same types of browser and desktop may reduce the size of the browser to occupy half, or some portion, of the display space. As such, when the webpage is displayed by the two browsers, the placeholder may be displayed with different sizes.

Various techniques may be implemented to address these challenges. In one technique, the server 110 may use a one-size fits all approach. In other words, the server may store one image of the camera, where the image may be large enough to be usable across all types of computing devices and applications. When the web page is displayed on the computing devices, that same image may be downloaded from the server 110 and displayed across the various computing devices. This one-size fits all approach may suffer from multiple drawbacks. For example, because the image may be too large for one computing device (e.g., a smartphone with a small screen), bandwidth waste may occur for downloading a non-optimized image.

In another technique, a media query may be implemented. In this technique, the server 110 may host various images of the camera, where each image may be sized for a particular type of computing device. Based on the type of the computing device displaying the web page, the server 110 may provide the corresponding image of the camera. This media-query technique may also suffer from multiple drawbacks. For example, responsiveness of the web page may deteriorate because the downloaded image may not depend on the size of the displayed placeholder. As such, if a browser occupies half the display space and, accordingly, the placeholder size is reduced by half, the image may be skewed to fit in the smaller placeholder.

To balance or optimize bandwidth usage and web page responsiveness, a fluid image technique may be implemented. In this technique, in addition or alternative to accounting for the types of computing devices and applications, the size of the placeholder may be considered in generating, storing, and downloading a proper image from the server 110 for display on the web page. In this technique, the server 110 may store a number of images (shown as images 112A through 112N in FIG. 1) that can be displayed in the placeholder on the web page. The web page may identify these available images and may include a script for determining the size of the placeholder as displayed or displayable on a computing device, for selecting a best fitting image from the available images, for causing an application (e.g., a browser) of the computing device to download the selected image, and for updating the web page to display the fetched image.

Implementing this fluid-image technique is illustrated in FIG. 1 and the remaining figures. As shown in FIG. 1, the desktop 120, desktop 130, smartphone 140, and smartphone 150 may display the web page with the placeholder showing an image of the camera. The desktop 120 and the desktop 130 may be a same type of computing devices and may even operate a same type of browsers. In this example, the browser on the desktop 130 may occupy less display space in comparison to the occupied display space of the browser of the desktop 120. As such, in this example, the same placeholder may be displayed with a larger size by the desktop 120 and with a smaller size by the desktop 130. Accordingly, the fluid-image technique may allow the web page to use the image 112A when the web page is displayed by the desktop 120 and to use the image 112B when the web page is displayed by the desktop 130. In this example, the image 112A may be larger in size than the image 112B, and each of the two images may be best fitting images based on the sizes of the placeholder as displayed by the desktops 120 and 130.

Similarly, the smartphone 140 may have a smaller display space than the desktops 120 and 130. As such, the size of the placeholder as displayed by the smartphone 140 may be small. Accordingly, the fluid-image technique may allow the web page to display a small image 112C best fitted for the smaller size of the placeholder.

In comparison, despite having a smaller display space, the size of the placeholder as displayed on the smartphone 150 may be similar to the size of the placeholder displayed at the desktop 130. That may because, for example, the browser on the desktop 130 may be reduced to a portion (e.g., half) of the corresponding display space and that reduction may result in similar browser sizes across the desktop 130 and the smartphone 150. In this situation, the fluid-image technique may allow the web page to also use the image 112B for the smartphone 150. In other words, despite having two different types of computing devices, because the placeholder sizes across the two computing devices (e.g., the smartphone 150 and the desktop 130) may be similar, the web page may use the same image 112B.

Hence, the fluid-image technique may allow a dynamic selection of a best fitting image based on various contexts, including a size of a placeholder holding the image, while also balancing bandwidth usage and web page responsiveness. As such, instead of having one image for all devices, and/or an image per type of devices, the web page may be dynamically updated to present the best fitting image based on the contexts. These and other features are further described in the next figures.

Figure 2:
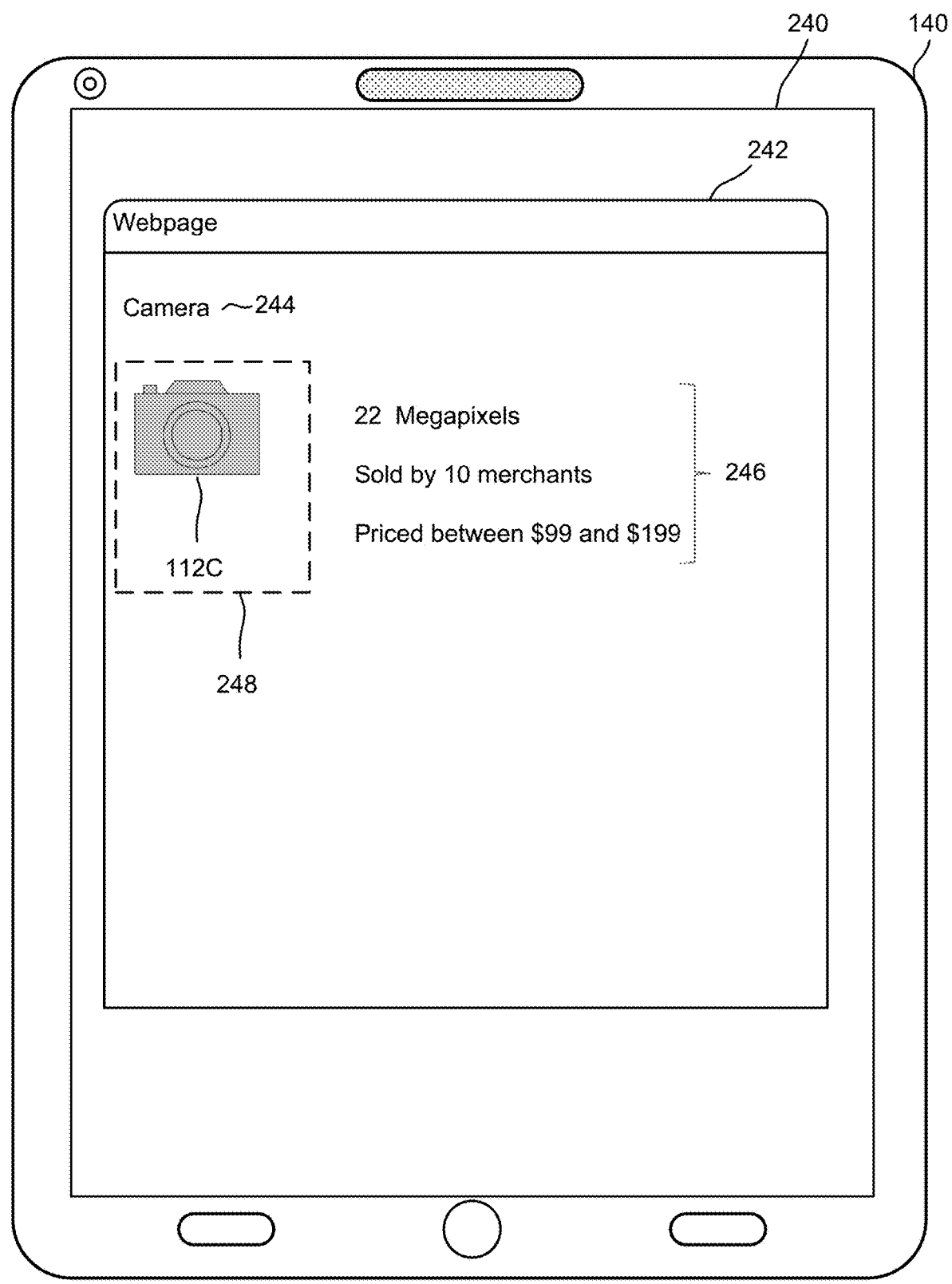
FIG. 2 illustrates an example computing device for presenting information to a user, according to embodiments.

Turning to FIG. 2, that figure illustrates an example device for presenting information to a user. More particularly, FIG. 2 shows an example of using the smartphone 150 to display the web page with the placeholder for the image of the camera. The described techniques of FIG. 2 similarly apply to other computing devices, such as the desktops 120 and 130 and the smartphone 150 of FIG. 1.

The user may operate the smartphone 140 to perform various interactions with the web site hosted on the server 110, such as to browse web pages of the web site. To facilitate the interactions, the smartphone 140 may be configured to provide a user interface 240 that may use touch screen and other technologies. In response to an interaction, the server 110 may provide and cause the smartphone 140 to display a web page 242 at the user interface 240.

The user interface 240 may include one or more windows that may display outputs of and may allow inputs to one or more processes. A web browser is an example of such processes and may be configured to render the web page 242 and to present various types of information that the web page 242 may contain. For example, the smartphone 140 may execute the browser and connect to the web site to retrieve and render web page 242 on the user interface 240. It should be apparent to a person of ordinary skill in the art that other processes may be used such as an application that may use, for example, a programmable application interface (API).

The information presented in the web page 242 may include, among other things, a title 244 (e.g., a descriptive title of the camera), a description 246 (e.g., a text describing various aspects of the camera such as technical features and offers for purchasing the camera), and the image 112C. As previously noted, the image 112C may be presented in a placeholder 248.

From the viewpoint of the user, the placeholder 248 may be a container that may hold the image 112C. For example, in the context of an electronic marketplace, the placeholder may be a field in which an image of the camera may be inserted. This field may correspond to a descriptive image field for describing an item offered for sale, a recommendation widget for recommending the item, an advertisement space for advertising the item, and other fields. Generally, the field may be transparent to the user (e.g., the placeholder 248 may not be visible or apparent to the user, but the image held therein may be). From the viewpoint of the web page 242, the placeholder 248 may be an object that may nest one or more elements and that may contain various attributes. For example, in HTML code of the web page 242, the placeholder 248 may represent an HTML object for defining images, attributes of the images, style properties, location on the web page 242, and other information.

Further, the placeholder 248 may have a size, such as a height and a width. This size can be expressed in pixel values (e.g., a height of 200 pixels and a width of 100 pixels) and can be defined in the HTML code of the web page 242. Although FIG. 2, illustrates the placeholder 248 as having a rectangular shape, other shapes and other ways for expressing the size may be used. For example, the placeholder 248 may have a circular shape instead and, accordingly, the size may be expressed as a radius.

Figure 3:
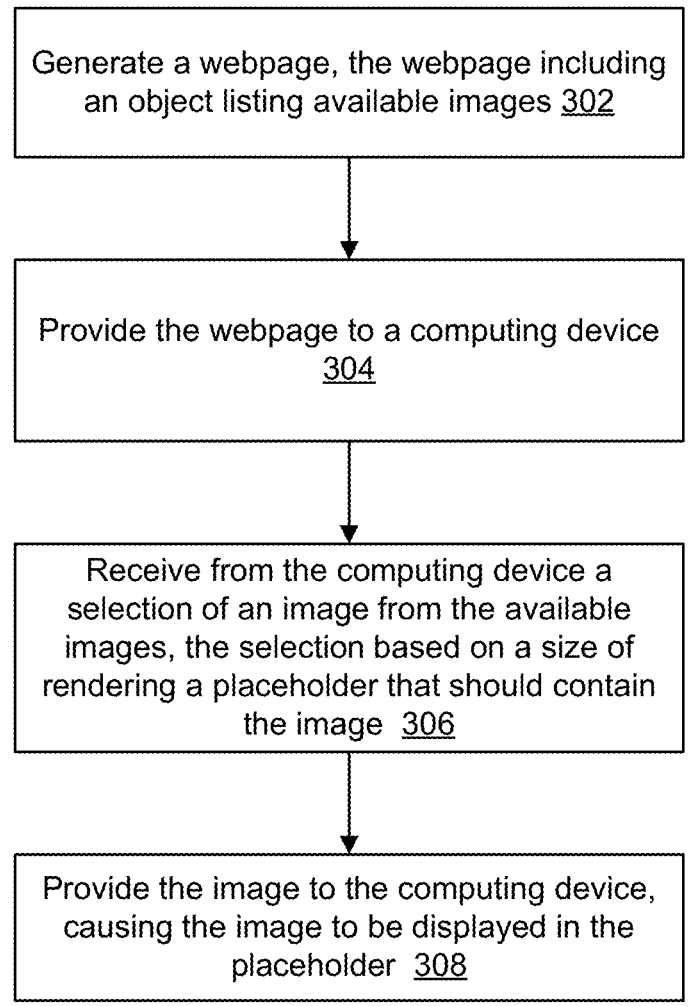
FIG. 3 illustrates an example flow for providing information to a computing device, according to embodiments.

Turning to FIG. 3, that figure illustrates an example flow for implementing the fluid-image technique described herein above. More particularly, the example flow may allow a service provider to generate or configure a web page that may use a best fitting image. The web page may contain a placeholder for displaying an image and may include a script for selecting and updating the web page to display the best fitting image in the placeholder. The selection of the image can be based on various contexts including, for example, the size of the placeholder as displayed or displayable in the web page on a user computing device.

The example flow of FIG. 3 may be embodied in, and fully or partially automated by, code modules executed by one or more processor devices, such as computing devices of the service provider. The code modules may be stored on any type of non-transitory computer-readable medium or computer storage device, such as hard drives, solid state memory, optical disc or other non-transitory medium. The results of the operations may be stored, persistently or otherwise, in any type of non-transitory computer storage such as, e.g., volatile or non-volatile storage. Also, while the flows are illustrated in a particular order, it should be understood that no particular order is necessary and that one or more operations or parts of the flows may be omitted, skipped, or reordered. Additionally, one of ordinary skill in the art will appreciate that a computing device of a user may perform corresponding operations to provide information to and allow interaction with the user.

The example flow of FIG. 3 may start at operation 302, where a web page may be generated. The service provider may operate a computing device to configure and store the web page on a server. The web page may include an object that may list available images. More particularly, the web page may include a placeholder for displaying an image of an item. To allow a selection of a best fitting image for display in the placeholder, a number of available images may be stored, where each image may have a different size. The web page may identify, under the object, these images and the corresponding sizes. An example of identifying an image may include using a URL of a storage location storing the image. An example of identifying an image size may include listing the height and width of the image. As initially configured, the object may have a type indicating an association with a placeholder. When the web page is displayed at a computing device and the selection of the best fitting image is made, the object type may be updated to indicate an image element causing the best fitting image to be displayed in placeholder. To enable the selection of the best fitting image and the update of the object, the web page may include a script, such as a JavaScript, that may provide this functionality. Further examples of the web page, and the associated code, are described in FIGS. 6-8.

At operation 304, the web page may be provided to a computing device. For example, a user may operate the computing device to access the web page over a network from the server. The server may transmit an instance of the web page to the user computing device for display thereat.

At operation 306, a selection of an image from the available images listed under the object of the web page may be received from the user computing device. In particular, the user computing device may run a browser for displaying the web page. The browser may parse the code of the web page and may run the script. The script may determine the size of the placeholder as displayed or displayable in the browser, may compare the placeholder size to the sizes of the available images, and may select therefrom the best fitting image based on this comparison. In an example, the best fitting image may be an image that may have the next largest size in comparison to the placeholder size. Subsequently, the script may update the object to an image element with a source set to the corresponding URL of the best fitting image. This update may trigger the browser to request the best fitting image using the URL. In turn, the user computing device may request the best fitting image from the server and, thus, the server may receive the request indication the selection of the best fitting image.

At operation 308, the best fitting image may be provided to the user computing device. For example, in response to the receiving the request, the server may transmit the image to the user computing device. Further, after downloading the best fitting image from the server, the browser may display the best fitting image in the placeholder. For example, because the script may have updated the object to an image element, the browser may display that image element in the placeholder on the web page using the best fitting image.

In the interest of clarity of explanation, the example flow of FIG. 3 and the embodiments implementing the fluid-image technique in the various figures are described using images and sizes of images. Nevertheless, the embodiments may similarly apply to other types of information, such as graphic objects, interactive components, or other information that may be displayed at a computing device. Also, the embodiments may not be limited to size attributes but may similarly apply to other properties, such as color, type of information, and other properties. For example, a best fitted graphic object may be a graphic object determined based on color criteria (e.g., does the application running on the computing device use black and white, gray scale, or full color graphic objects). In another example, a best fitted graphic object may be a graphic object determined based on a type of the graphic object (e.g., does the application running on the computing device use non-HD, HD, or ultra HD graphic objects).

Figure 4:
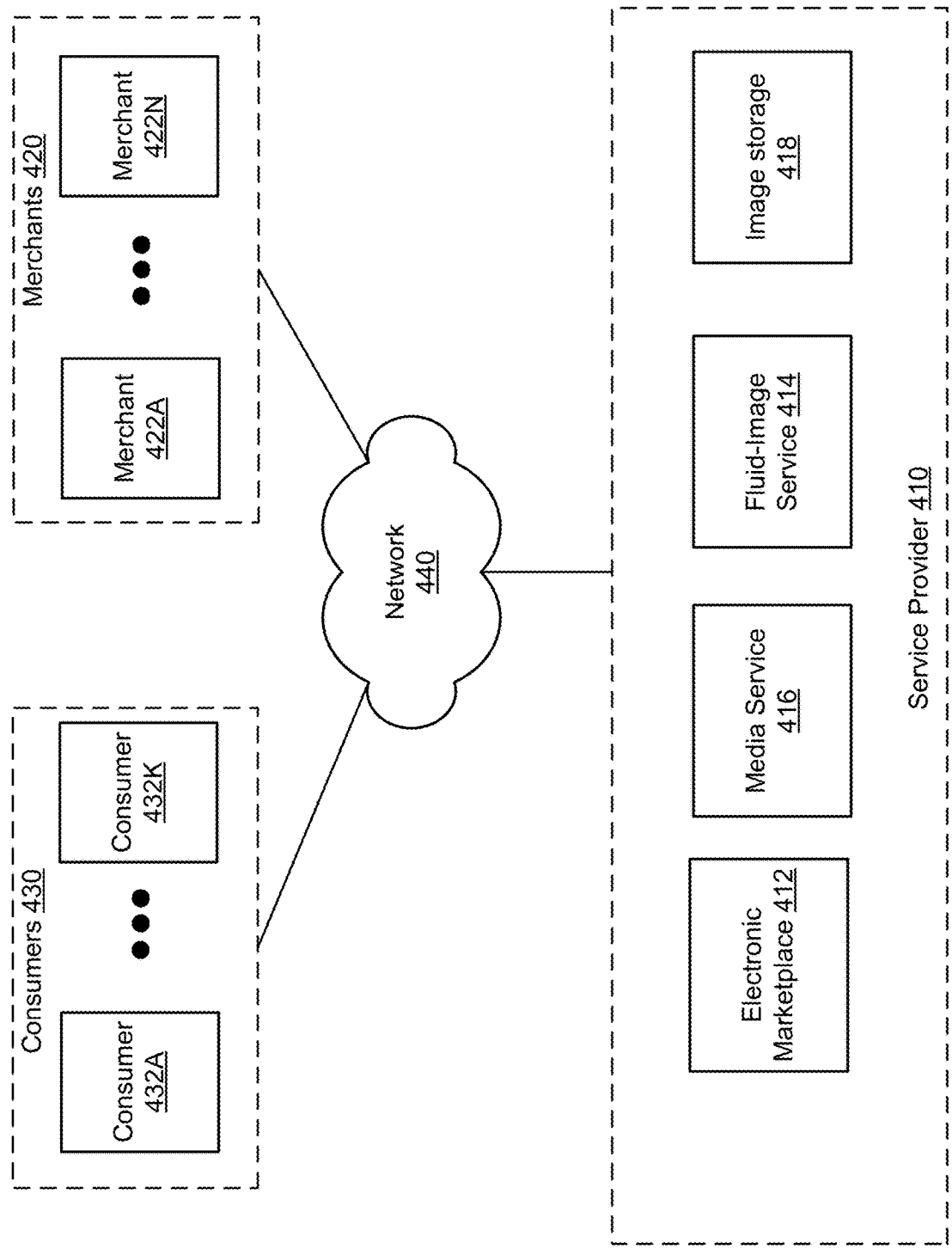
FIG. 4 illustrates an example computing environment for offering items, according to embodiments.
Figure 5:
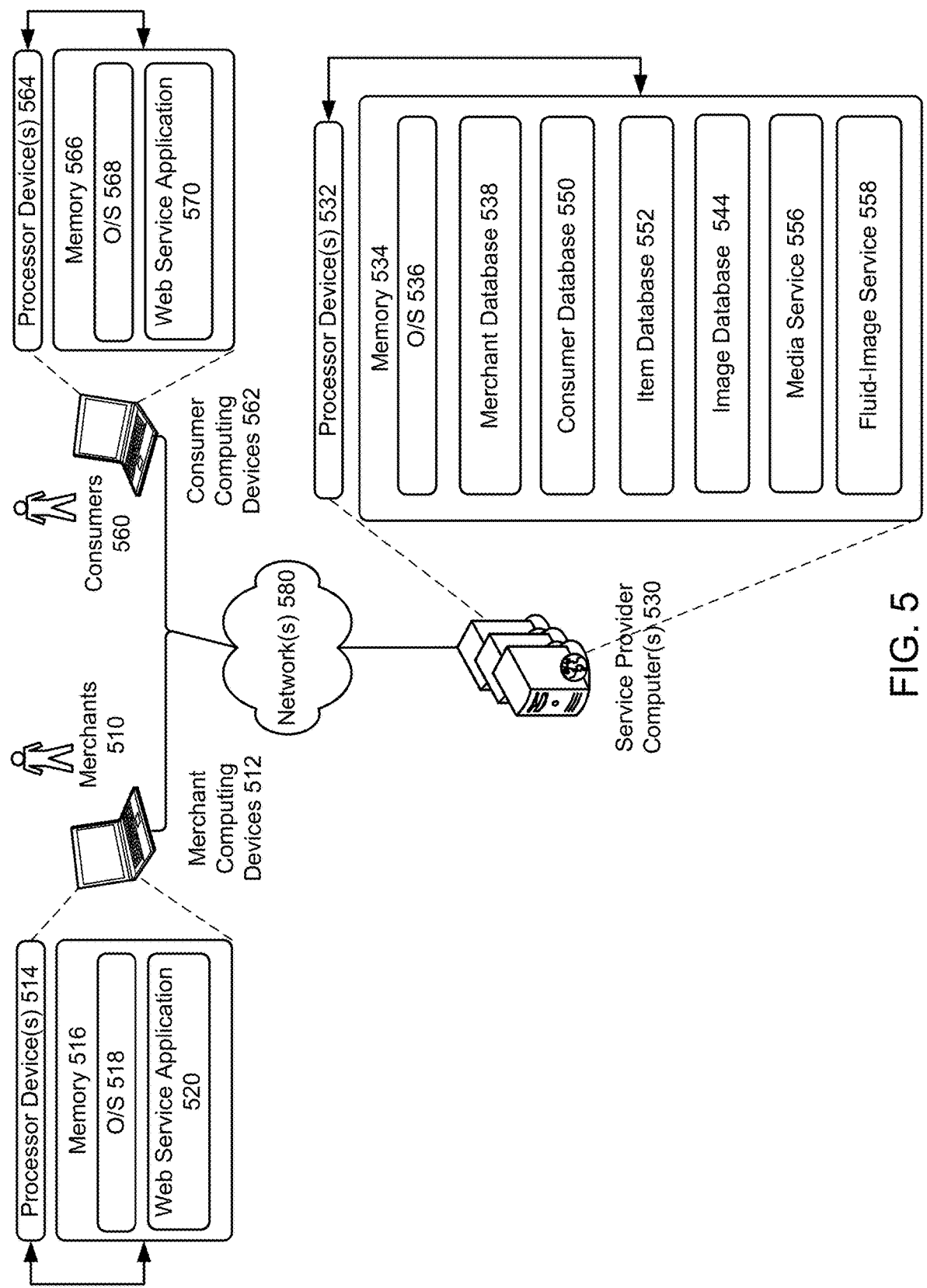
FIG. 5 illustrates an example architecture for offering items, including at least one user device and/or one or more service provider computers connected via one or more networks according to embodiments.

Similarly, in the interest of clarity of explanation, the embodiments implementing the fluid-image techniques in the various figures are described within the context of images of items offered at an electronic marketplace. FIGS. 4 and 5 illustrate an example computing environment for providing such an electronic marketplace. Nevertheless, the embodiments may similarly apply to other computing environments, such as an environment where a document from a network-based resource may be provided to computing devices. An example of such an environment may include, for example, a news web site providing news articles to users operating a spectrum of various computing devices.

Turning to FIG. 4, that figure illustrates an example computing environment for implementing the fluid-image techniques to generate web pages dynamically updatable to display best fitting images. In particular, the illustrated computing environment may be configured to allow a service provider 410 of an electronic marketplace 412 to implement a fluid-image service 414. The fluid-image service 114 may implement the fluid-image techniques as described herein. As such, the fluid-image service 114 may allow the service provider 410 to generate web pages that may list available images. The fluid-image service 114 may also allow computing devices to display and update the web pages with best fitting images. A best fitting image may be selected based on various contexts including, for example, a size of a placeholder for displaying the image in the web page.

Generally, users of the electronic marketplace 412 may include, for example, merchants 420 and consumers 430. The merchants 430 may offer items for sale at the electronic marketplace 412 and the consumers 430 may browse and obtain offered items by way of the electronic marketplace 412. To provide this functionality, the service provider 410 may generate web pages associated with the items. The web page generation can be partially or fully automated by using various services including, for example, the fluid-image service 414.

More particularly, the service provider 410, the merchants 420, and the consumers 430 may operate various types of computing devices to connect over a network 440. The service provider 410 may configure the electronic marketplace 412 to provide various functions and features to the merchants 420 and consumers 430, including for example, allowing the merchants 420 to offer items via web pages of the electronic marketplace 412 and allowing the consumers 430 to review and obtain the items from the merchants 420 by way of the web pages.

As shown, there may be a large number of merchants 422A-422N. Each of these merchants may offer various items. The items may be offered via web pages of the electronic marketplace 412. Typically, an offer for an item may include a description of the item and a description of the offer. The item description may include, among other things, text and images for presenting information about the item. An image may be displayed in a placeholder on a corresponding web page. The description of the offer may include, among other things, the price and an identifier of the merchant.

There may also be a large number of consumers 432A-432K. Each of the consumers 430 may browse, search, and/or order various items from the merchants 420 by way of the web pages. For example, one consumer may search for a particular item from a particular merchant, while another consumer may search for another item from all available merchants. Similarly, one consumer may be interested in a category of items. The various behaviors of the consumers may be tracked and, accordingly, items may be recommended. For example, when a consumer may be looking for a particular sport article via a web page of the electronic marketplace 412, that web page may present a recommendation widget that may show various other sport articles. The recommendation widget may include placeholders for presenting images of the articles.

The service provider 410 may implement the fluid-image service 414 to facilitate or support the generation of the web pages. In an example, the fluid-image service 414 may provide a user interface to the merchants 420 for defining offers of items. In this way, a merchant wanting to offer an item may use the interface to enter the corresponding item and offer descriptions. The fluid-image service 414 may receive this information and generate a web page accordingly. Alternatively, the fluid-image service 414 may interact with another service of the electronic marketplace 412 to generate the web page. Either way, the fluid-image service 414 may enable the generation of the web page such that the web page may include a list of available images of the item and may be dynamically updatable to display a best fitting image.

Further, the fluid-image service 414 may implement various techniques for generating the available images of the item listed in the web page. In one technique, the fluid-image service 414 may configure the interface such that the merchant may upload the images. For example, the interface may identify the image requirements (e.g., a rule specifying particular number and sizes of the images) and may allow the merchant to provide the images accordingly. In another technique, the fluid-image service 114 may interact with a media service 416 to receive the images. The media service 416 may also be implemented by the service provider 410 within the context of the electronic marketplace 412. More particularly, the media service 416 may receive one or more images from the merchant (e.g., by way of the interface) and may edit the images to meet the requirements (e.g., the rule). For example, if the merchant provides one image, the media service 416 may generate the particular number of images according to the particular sizes. Thereafter, the media service 416 may provide the images to the fluid-image service 414 or may store the images at a storage location accessible to the fluid-image service 414. Regardless of which technique may be implemented, the images may be stored at the image storage 418. The image storage 418 may also be implemented by the service provider 410 within the context of the electronic marketplace 412 and may be accessible to the fluid-image service 414. As stored, each of the images may be assigned a URL and may be associated with metadata. The metadata associated with an image may identify the image, the size of the image, and other attributes of the image. As such, when generating the web page, the fluid-image service 414 may use the URLs and information from the metadata (e.g., the sizes) to list in the code of the web page the available images.

Additionally, the fluid-image service 414 may also support interactions with the consumers 430. In particular, when a consumer accesses a web page of the electronic marketplace, and when a script running on the web page causes a request for a best fitting image, the request may be received and processed by the fluid-image service 414. In this way, the fluid-image service 414 may retrieve the best fitting image from the image storage 418 and may return this image to the computing device of the consumer for display in the web page. In another example, the fluid-image service 414 may not be involved in the processing of the request. Instead, another service of the electronic marketplace (e.g., an API) may retrieve and provide the best fitting image from the image storage 418 to the computing device.

Hence, by implementing the fluid-image service 414, the service provider 410 may provide various functionalities to the merchants 420 and consumers 430. For example, a merchant may offer a camera and provide images of the camera. Accordingly, in association with the camera, a web page may be generated. The web page may identify the images and may include a script to select a best fitting image based on, for example, a size of a placeholder. In turn, a consumer may run a browser on a computing device to access the web page. Based on the size of the placeholder in the web page displayed in the browser, the script may select the best fitting image causing the web page to be updated to display the best fitting image in the placeholder. In this way, the fluid-image service 414 may enhance the merchant experience and the consumer experience. On one hand, the merchant may rely on the fluid-image service 414 to generate a web page that may display a best fitting image. On the other the consumer may experience a responsive web page that may display a best fitting image and that may use just enough bandwidth.

Turning to FIG. 5, that figure illustrates an example end-to-end computing environment for implementing the fluid-image techniques. In this example, a service provider may implement a fluid-image service, such as the fluid-image service 414 of FIG. 4, part of an electronic marketplace available to users, such as the merchants 420 and the consumers 430 of FIG. 4.

Ina basic configuration, merchants 510 may utilize merchant computing devices 512 to access local applications, a web service application 520, merchant accounts accessible through the web service application 520, or a web site or any other network-based resources via one or more networks 580. In some aspects, the web service application 520, the web site, or the merchant accounts may be hosted, managed, or otherwise provided by one or more computing resources of the service provider, such as by utilizing one or more service provider computers 530. The merchants 510 may use the local applications or the web service application 520 to interact with the network-based resources of the service provider. These interactions may include, for example, offering items for sale, providing images of the items, and supporting transactions with consumers.

In some examples, the merchant computing devices 512 may be any type of computing devices such as, but not limited to, a mobile phone, a smart phone, a personal digital assistant (PDA), a laptop computer, a thin-client device, a tablet PC, etc. In one illustrative configuration, the merchant computing devices 512 may contain communications connection(s) that allow merchant computing devices 512 to communicate with a stored database, another computing device or server, merchant terminals, or other devices on the networks 580. The merchant computing devices 512 may also include input/output (I/O) device(s) or ports, such as for enabling connection with a keyboard, a mouse, a pen, a voice input device, a touch input device, a display, speakers, a printer, etc.

The merchant computing devices 512 may also include at least one or more processing units (or processor device(s)) 514 and one memory 516. The processor device(s) 514 may be implemented as appropriate in hardware, computer-executable instructions, firmware, or combinations thereof. Computer-executable instruction or firmware implementations of the processor device(s) 514 may include computer-executable or machine-executable instructions written in any suitable programming language to perform the various functions described.

The memory 516 may store program instructions that are loadable and executable on the processor device(s) 514, as well as data generated during the execution of these programs. Depending on the configuration and type of merchant the computing devices 512, the memory 516 may be volatile (such as random access memory (RAM)) or non-volatile (such as read-only memory (ROM), flash memory, etc.). The merchant computing devices 512 may also include additional storage, which may include removable storage or non-removable storage. The additional storage may include, but is not limited to, magnetic storage, optical disks, or tape storage. The disk drives and their associated computer-readable media may provide non-volatile storage of computer-readable instructions, data structures, program modules, and other data for the computing devices. In some implementations, the memory 516 may include multiple different types of memory, such as static random access memory (SRAM), dynamic random access memory (DRAM), or ROM.

Turning to the contents of the memory 516 in more detail, the memory may include an operating system (O/S) 518 and the one or more application programs or services for implementing the features disclosed herein including the web service application 520. In some examples, the merchant computing devices 512 may be in communication with the service provider computers 530 via the networks 580, or via other network connections. The networks 580 may include any one or a combination of many different types of networks, such as cable networks, the Internet, wireless networks, cellular networks, and other private or public networks. While the illustrated example represents the merchants 510 accessing the web service application 520 over the networks 580, the described techniques may equally apply in instances where the merchants 510 interact with the service provider computers 530 via the merchant computing devices 512 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, consumers 560 may utilize consumer computing devices 562 to access local applications, a web service application 570, consumer accounts accessible through the web service application 570, or a web site or any other network-based resources via the networks 580. In some aspects, the web service application 570, the web site, or the user accounts may be hosted, managed, or otherwise provided by the service provider computers 530 and may be similar to the web service application 520, the web site accessed by the computing device 512, or the merchant accounts, respectively. The consumers 560 may use the local applications or the web service application 570 to conduct transactions with the network-based resources of the service provider. These transactions may include, for example, searching for and purchasing items from the merchants 510.

In some examples, the consumer computing devices 562 may be configured similarly to the merchant computing devices 512 and may include at least one or more processing units (or processor device(s)) 564 and one memory 566. The processor device(s) 564 may be implemented as appropriate in hardware, computer-executable instructions, firmware, or combinations thereof similarly to the processor device(s) 514. Likewise, the memory 566 may also be configured similarly to the memory 516 and may store program instructions that are loadable and executable on the processor device(s) 564, as well as data generated during the execution of these programs. For example, the memory 566 may include an operating system (O/S) 568 and the one or more application programs or services for implementing the features disclosed herein including the web service application 570.

As described briefly above, the web service applications 520 and 570 may allow the merchants 510 and consumers 560, respectively, to interact with the service provider computers 530 to conduct transactions involving items. The service provider computers 530, perhaps arranged in a cluster of servers or as a server farm, may host the web service applications 520 and 570. These servers may be configured to host a web site (or combination of web sites) viewable via the computing devices 512 and 562. Other server architectures may also be used to host the web service applications 520 and 570. The web service applications 520 and 570 may be capable of handling requests from many merchants 510 and consumers 560, respectively, and serving, in response, various interfaces that can be rendered at the computing devices 512 and 562 such as, but not limited to, a web site. The web service applications 520 and 570 can interact with any type of web site that supports interaction, social networking sites, electronic retailers, informational sites, blog sites, search engine sites, news and entertainment sites, and so forth. As discussed above, the described techniques can similarly be implemented outside of the web service applications 520 and 570, such as with other applications running on the computing devices 512 and 562, respectively.

The service provider computers 530 may, in some examples, provide network-based resources such as, but not limited to, applications for purchase or download, web sites, web hosting, client entities, data storage, data access, management, virtualization, etc. The service provider computers 530 may also be operable to provide web hosting, computer application development, or implementation platforms, or combinations of the foregoing to the merchants 510 and consumers 560.

The service provider computers 530 may be any type of computing device such as, but not limited to, a mobile phone, a smart phone, a personal digital assistant (PDA), a laptop computer, a desktop computer, a server computer, a thin-client device, a tablet PC, etc. The service provider computers 530 may also contain communications connection(s) that allow service provider computers 530 to communicate with a stored database, other computing devices or server, merchant terminals, or other devices on the network 580. The service provider computers 530 may also include input/output (I/O) device(s) or ports, such as for enabling connection with a keyboard, a mouse, a pen, a voice input device, a touch input device, a display, speakers, a printer, etc.

Additionally, in some embodiments, the service provider computers 530 may be executed by one more virtual machines implemented in a hosted computing environment. The hosted computing environment may include one or more rapidly provisioned and released network-based resources, which network-based resources may include computing, networking, or storage devices. A hosted computing environment may also be referred to as a cloud computing environment. In some examples, the service provider computers 530 may be in communication with the computing devices 512 and 562 via the networks 580, or via other network connections. The service provider computers 530 may include one or more servers, perhaps arranged in a cluster, or as individual servers not associated with one another.

In one illustrative configuration, the service provider computers 530 may include at least one or more processing units (or processor devices(s)) 532 and one memory 534. The processor device(s) 532 may be implemented as appropriate in hardware, computer-executable instructions, firmware, or combinations thereof. Computer-executable instruction or firmware implementations of the processor device(s) 532 may include computer-executable or machine-executable instructions written in any suitable programming language to perform the various functions described.

The memory 534 may store program instructions that are loadable and executable on the processor device(s) 532, as well as data generated during the execution of these programs. Depending on the configuration and type of the service provider computers 530, the memory 534 may be volatile (such as random access memory (RAM)) or non-volatile (such as read-only memory (ROM), flash memory, etc.). The service provider computers 530 may also include additional removable storage or non-removable storage including, but not limited to, magnetic storage, optical disks, or tape storage. The disk drives and their associated computer-readable media may provide non-volatile storage of computer-readable instructions, data structures, program modules, and other data for the computing devices. In some implementations, the memory 534 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 534 in more detail, the memory may include an operating system (O/S) 536, a merchant database 538 for storing information about the merchants 510, a consumer database 550 for storing information about the consumers 560, an item database 552 for storing information about items, an image database 544 for storing images of items, a media service 556 for editing images provided by the merchants 510, and a fluid-image service 558.

The service provider may configure the fluid-image service 558 to facilitate the generation web pages that may list available images and that may be dynamically updated to display best fitting images, similarly to the fluid-image service 414 of FIG. 4. To do so, the fluid-image service 558 may interface with any of the databases 538-554 and the media service 516. Although FIG. 5 illustrates the databases 538-554 as stored in the memory 534, these databases or information from these databases may be additionally or alternatively stored at a storage device remotely accessible to the service provider computers 530. Configurations and operations of the fluid-image service 558 are further described in greater detail below with reference to at least FIGS. 6-8.

Figure 6:
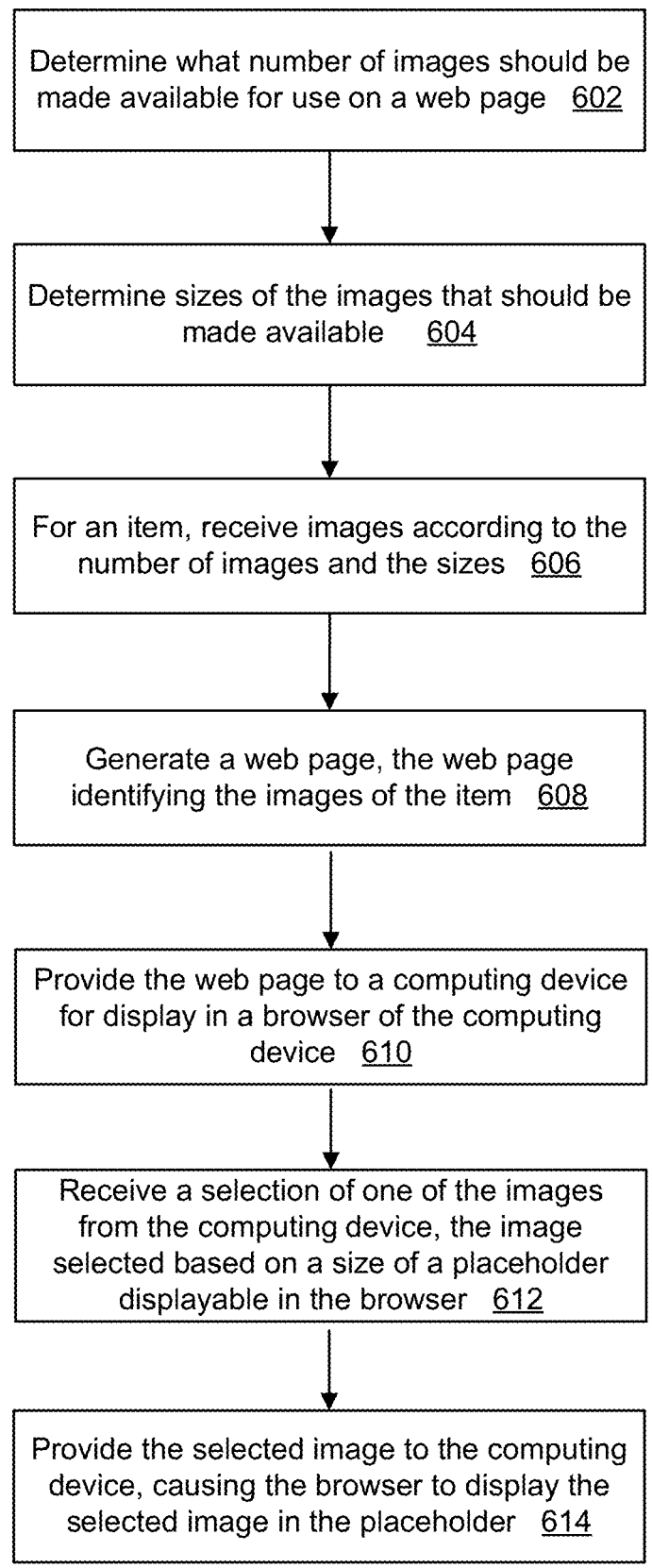
FIG. 6 illustrates an example flow for generating a web page, according to embodiments.
Figure 7:
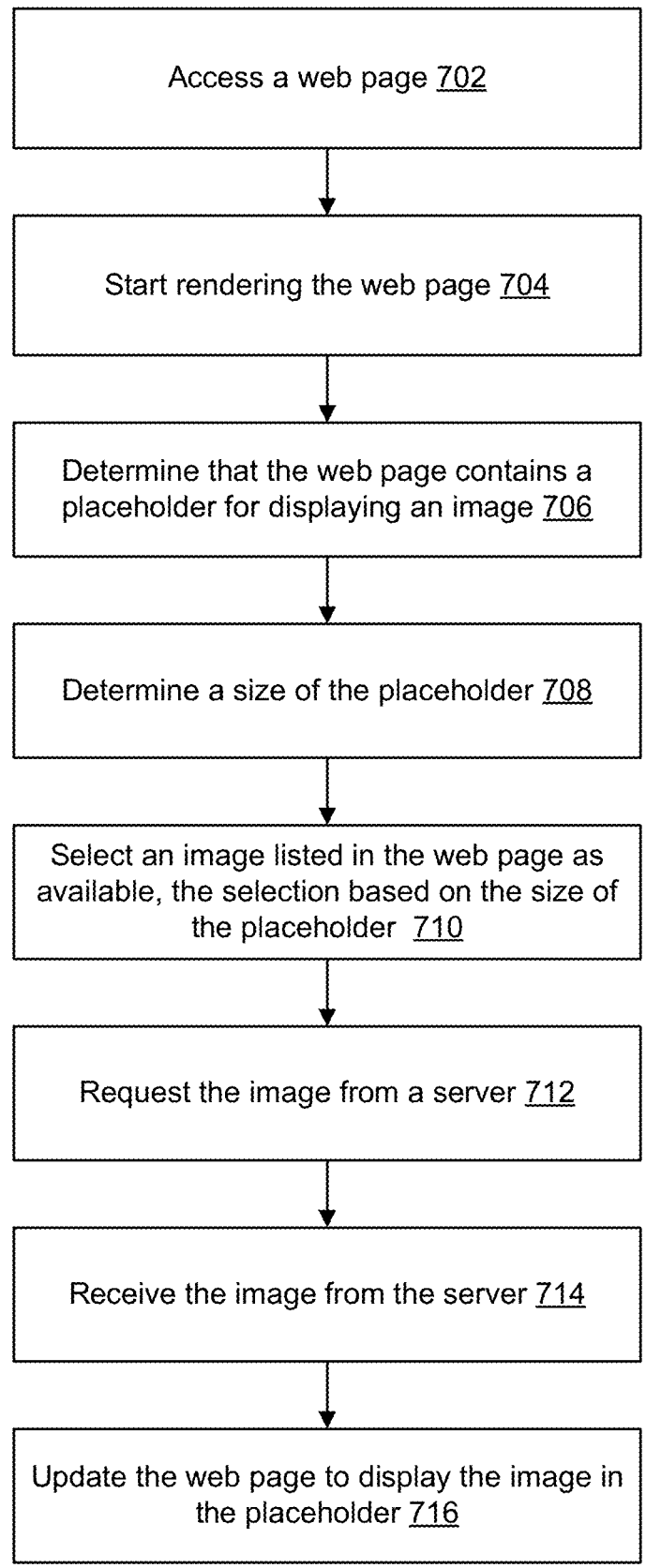
FIG. 7 illustrates an example flow for presenting information on a web page, according to embodiments.
Figure 8:
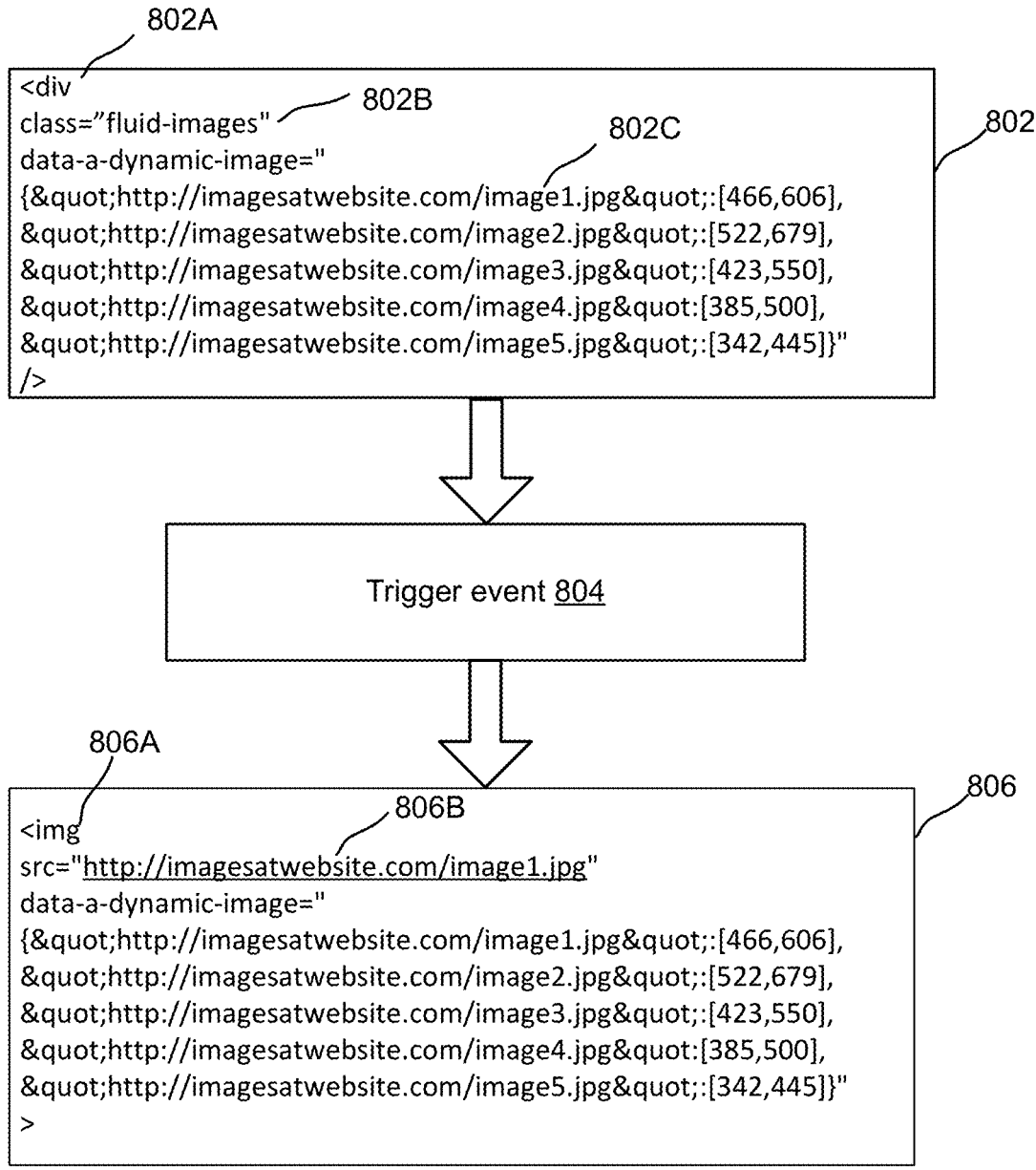
FIG. 8 illustrates an example update to a web page for presenting information, according to embodiments.

More particularly, FIGS. 6-8 illustrate example flows and code for generating and using a web page that may be dynamically updated to display a best fitting image. FIG. 6 illustrates an example flow that a fluid-image service may implement to generate such a web page. In comparison, FIG. 7 illustrates an example flow that an application (e.g., a browser) running on a computing device may implement to use the web page. On the other hand, FIG. 8 illustrates an example code that the fluid-image service may include in the web page and an example update to the code to display the best fitting image.

The example flows of FIGS. 6 and 7 may be embodied in, and fully or partially automated by, code modules executed by one or more processor devices. The code modules may be stored on any type of non-transitory computer-readable medium or computer storage device, such as hard drives, solid state memory, optical disc or other non-transitory medium. The results of the operations may be stored, persistently or otherwise, in any type of non-transitory computer storage such as, e.g., volatile or non-volatile storage. Also, while the flows are illustrated in a particular order, it should be understood that no particular order is necessary and that one or more operations or parts of the flows may be omitted, skipped, or reordered.

Turning to FIG. 6 that figure illustrates an example flow for generating a web page that may be dynamically updated to display a best fitting image. Generally, the web page may display, among other things, a placeholder for holding an image and may be dynamically updated to display a best fitting image in the placeholder. From a viewpoint of code (e.g., HTML code), the web page may include code for the placeholder, code for identifying available images, and a script (e.g., JavaScript). The script may be executed, as shown in the example flow of FIG. 7, to select the best fitting image and to update the code of the web page causing the best fitting image to be rendered in the placeholder. Example code is illustrated in FIG. 8. Further, generating the web page to include such code may account for bandwidth and responsiveness rules. These rules may specify, for example, the particular number of expected images (e.g., a defined or required number of images) to be made available for display in the placeholder and the associated attributes of the images. In some examples, the number of images may be selected or otherwise defined (and/or modified). These and other features are described herein next.

The example flow of FIG. 6 may start at operation 602, where a fluid-image service running on a server may determine what number of images should be made available for use in a web page. More particularly, the fluid-image service may determine how many images should be listed as available for display in a placeholder of the web page. This determination may consider various factors to balance bandwidth usage with web page responsiveness. The factors may include types of computing devices that users may operate, types of browsers that may run on the computing devices, sizes of the browsers, sizes of placeholders displayed within web pages by the browsers, and/or other factors. In an example, the fluid-image service may determine these factors by tracking usage history of users. As such, within the context of an electronic marketplace, the fluid-image service (or another service) of the electronic marketplace may track these factors for consumers browsing web pages of the electronic marketplace. The fluid-image service may analyze the usage history using various techniques, such as empirical testing, A/B testing, or other techniques to determine an optimum number for images to be made available.

Generally, four to eight images available for a placeholder may provide a good solution. More particularly, the lower the number, the more bandwidth waste may occur. On the other hand, the higher the number, the more likely that responsiveness may deteriorate. Four to eight images may provide a large enough pixel separation to avoid random loads associated with resizing of a browser. The pixel separation may reflect a change in image sizes between two available images. In other words, because a browser may be randomly resized on a computing device causing an already displayed web page and placeholder to be resized, with small pixel separation, likelihood of selecting and downloading a new best fitting image based on the new size of the placeholder may increase, impacting bandwidth usage and web page responsiveness. In comparison, large pixel separation may avoid this problem. For example, for small browser and, thus, placeholder resizing, an already displayed image in the placeholder may still be a best fitting image because of the large pixel separation between the available images. However, a pixel separation that may be too large may, for example, waste bandwidth because the best fitting image may be an image larger than what may be needed.

At operation 604, the fluid-image service may determine sizes of the images that should be made available. The fluid-image service may consider similar factors and apply a similar analysis as described herein above to determine range of acceptable image sizes. For example, the fluid-image service may analyze the usage history to determine a range of placeholder sizes. The fluid-image service may divide this range by the number of particular images to determine the range of acceptable image sizes. An image with a size falling in one of the determined range may meet the image size rule. To illustrate, if the placeholder size range varies between [100,100] and [600,600] and if the number of particular images is five, the fluid-image service may determine that the image size range should be in increments of [100,100] indicating a [100,100] pixel separation. As such, the image size range may include image sizes of [100,100] to [200, 200], [200,200] to [300, 300], and so on up to [500, 500] to [600, 600].

The fluid-image service may perform the operations 602 and 604 for a plurality of items in one example, or for a particular item in another example. Said differently, the considered factors may be associated with the plurality of items. In this example, the determined number and sizes of the images may be applicable to a web page that may display an image of any of these items. On the other hand, the considered factors may be associated with a particular item instead. In this example, the particular number and sizes of the images may be applicable to only a web page that may display an image of the particular item.

At operation 606, the fluid-image service may, for an item, receive images according to the determined number and sizes of images. In an example, the fluid-image service may receive the images from a merchant of the item. In another example, the fluid-service may receive the images from a media service. The number of the received images may meet the number determined at the operation 602. Similarly, the sizes of the received images may meet the sizes determined at the operation 604. For example, and continuing with the previous illustrations, five images may be received, where each of the images may belong to one of the image size ranges, and where no two images may belong to the same image size range. As such, the five received images may be [125, 150], [260, 220], [350, 350], [425, 475], and [540, 510] in size.

At operation 608, the fluid-image service may generate a web page that may identify the received images of the item. The web page may be hosted within a web site by the server. To do so, in the code of the web page, the fluid-image service may include code for the placeholder, code identifying the images, and a script for selecting a best fitting image from the available images and for updating the code of the web page to display the best fitting image in the placeholder. An example code is further illustrated in FIG. 8. Briefly, instead of defining each of the images or one of the images as an image element that should be rendered, the code of the web page may identify the available images and may allow the script to determine the size of the placeholder, to select a best fitting image from the identified images based on the size of the placeholder, and to update the web page to render the best fitting image.

Various techniques may be used to identify the images. In one technique, the code of the web page may list URLs of the images and the corresponding image sizes. In another technique, the code of the web page may only list the available image sizes and, once a best fitting image is selected, may allow the script to request the corresponding URL from the server. Regardless of which technique may be used, the code of the web page may define, for example, a <div> element for the list of images. The <div> element may include a class identifying the placeholder. URLs, sizes, and/or other attributes of the images may be attached as attributes to the <div> element. A <div> element and a class are used herein in the interest of clarity of explanation. Nevertheless, other code components may be used. In particular, a component that may indicate a division or a section in the web page may be used instead of the <div> element.

Similarly, a component that may allow the script to make changes to elements of the web page according to the component (e.g., a JavaScript changing the <div> element to an image element via an HTML document object model (DOM) based on the component) may be used instead of the class.

As such, when a browser starts loading the web page and executes the script, the script may determine that the <div> element may be associated with the placeholder and may change the <div> element to an image element. Further, the script may fetch the size of the placeholder. The size of the placeholder may be the displayed size on the web page. Alternatively, if the placeholder has not been displayed yet (e.g., the placeholder may be in a scroll-down portion of the web page that may not be visible yet), the size of the placeholder may be the displayable size based on the size of the displayed web page. As further illustrated in the example flow of FIG. 7, the script may select the best fitting image based on a comparison between the size of the placeholder and the sizes of the images. Accordingly, the script may update the code of the web page from the <div> element to an image element (e.g., <img>) causing the web page to display the best fitting image in the placeholder.

At operation 610, the fluid-image service, or another service that may be implemented on the server, may provide the web page to a computing device for display in a browser running on the computing device. For example, in the context of an electronic marketplace, a consumer may operate a browser on a computing device to browse the web page.

At operation 612, the fluid-image service, or another service that may be implemented on the server, may receive a selection of one of the identified images from the computing device. This image may be the best fitting image. As further illustrated in the example flow of FIG. 7, when the web page is displayed in the browser, the script may select the best fitting image from the identified images based on the size of the placeholder and may cause the browser to download the best fitting image from the server. As such, the fluid-image service (or the other service) may receive a request from the computing device identifying the best fitting image for download.

At operation 614, the fluid-image service, or another service that may be implemented on the server, may provide the selected image to the computing device, causing the browser to display the selected image in the placeholder. For example, the fluid-image service (or the other service) may send the image to the computing device. As further illustrated in the example flow of FIG. 7, the script may update the <div> element to the image element causing the browser to render the downloaded image in the placeholder.

Hence, by implementing the example flow of FIG. 6, a service provider may generate and host on a server a web page that may be dynamically updated to display a best fitting image. In this way, when a computing device displays the web page, a best fitting image that may balance bandwidth usage and web page responsiveness may be downloaded to the computing device and displayed in the web page.

In the interest of clarity of explanation, the embodiments herein are described in the context of using sizes of placeholders and images. A size may be expressed as a function of height and width as described herein above. However, a size may be expressed in other ways. For example, a size may be expressed as a function of only a height or width (e.g., for placeholders with a square shape), a radius (e.g., for placeholders with a circular shape), height and a ratio for the width, width and a ratio for the height, height and an image aspect ratio, width and an image aspect ratio, diagonal, and other functions. Similarly, size may not be limited to dimensions. Instead, size may include resolution (e.g., amount of pixels such as twenty megapixels or any other amount), a data size (e.g., an amount of bytes such as twenty megabytes or any other amount), and other sizes. Additionally, the embodiments may not be limited to sizes of images but may include other properties of images and, more generally, of objects. These properties may be defined as attributes in the code of the web page (e.g., in the code of the <div> and image elements).

Turning to FIG. 7 that figure illustrates an example flow for using a web page that may be dynamically updated to display a best fitting image. Generally, the web page may display, among other things, a placeholder for holding an image and may be dynamically updated to display a best fitting image in the placeholder. As described herein above, the web page may include code for the placeholder, code for identifying available images, and a script for selecting a best fitting image from the available images and for displaying the best fitting image in the placeholder. More particularly, the script may provide various functionalities, such as determining the placeholder size, selecting the best fitting image, and/or causing the browser to display the best fitting image in the placeholder. Causing the browser to display the best fitting image may include converting a <div> element to an image element such that the browser may render the best fitting image in the placeholder. Any or all of these functionalities may be initiated based on a trigger event. For example, the trigger event may be implemented based on a right there and then approach. In other words, the script may provide the functionalities when the placeholder may be brought in view (e.g., may be actually displayed in the browser). In another example, the trigger event may be implemented based on a before needed approach. In this example, when the browser is rendering the web page and before rendering the placeholder (e.g., the placeholder may be in a scroll-down portion of the web page that may not be visible yet), the script may provide the functionalities. In this way, when the placeholder is brought in view, the best fitting image may already have been selected, downloaded, and available for use. These and other features are described herein next.

In an example of the before needed approach, the script can be configured to determine a viewing area and a distance from the placeholder to an edge of the viewing area. The distance may be expressed as a pixel quantity. In this example, the trigger event may be a predefined threshold (e.g., 200 pixels away, or some other quantity, from the bottom edge of the viewing area). As such, if the distance approaches, equals, or is less than the threshold, the script may determine that the trigger event has occurred and may convert, for instance, the <div> element to the image element.

The example flow of FIG. 7 may start at operation 702, where a browser running a computing device may access a web page hosted on a server. The web page may be configured as described herein above to include, for example, code for the placeholder, code for identifying available images, and a script for selecting and displaying a best fitting image.

At operation 704, the browser may start rendering the web page. For example, a rendering engine of the browser may start laying out the web page based on the associated code (e.g., HTML code). At operation 706, the browser may determine that the web page may contain a placeholder for displaying an image. For example, the code of the web page may be parsed and the code for the placeholder may be identified.

At operation 708, the browser may determine a size of the placeholder. For example, the browser may execute the script. In turn, the script may determine that an element of the web page (e.g., a <div> element identifying available images) may be associated with the placeholder (e.g., via a corresponding class). Based on the elements and/or attributes of the placeholder, the script may determine the placeholder size. For example, if the placeholder is already displayed on the web page, the script may retrieve the corresponding height and width from the attributes of the placeholder. On the other hand, if the placeholder is not already display, the script may retrieve and set the corresponding height and width as a ratio of the height and width of the displayed web page (e.g., if the browser displays the web page on half the display space, the script may set the placeholder size to fifty percent of the size defined in the attribute).

At operation 710, the browser may select one of the available images as a best fitting image. This selection may be based on the placeholder size. For example, the script may compare the sizes of the available images as identified in the code of the web page to the size of the placeholder. An image with a best match may be set as the best fitting image. Various techniques may be used for defining what a best match may be. In one technique, the image with the next largest size in comparison to the placeholder size may be the best match. In this way, webpage responsiveness may be improved with little bandwidth penalty. Said differently, because the best fitting image may be the next largest image, small and random changes to the placeholder size (e.g., because of a random resize of the browser or the web page), such changes may not require a selection and a download of a new best fitting image. In another technique, the image with the next smallest size in comparison to the placeholder size may be the best match. This technique may improve the bandwidth usage but may impact the web page responsiveness. In yet another technique, an alternation, whether random or at predefined intervals, between the next smallest and the next largest image may be used. This technique may further balance bandwidth usage against web page responsiveness. In a further technique, other factors in addition to the placeholder size may be considered. For example, based on also the type of the computing device and/or the size of the browser, the script may select the next smallest or next largest image as the best match.

At operation 712, the browser may cause the computing device to request the best fitting image from the server. For example, after selecting the best fitting image from the available images, the script may change the element identifying the available images to an image element identifying the best fitting image (e.g., from a <div> element to an <img> element). The script may set the source of the image element as a URL of the best fitting image. This update may cause the browser to download the best fitting image from the server.

At operation 714, the browser may receive the best fitting image from the server by way of the computing device. Said differently, the browser may download the best fitting image from the server. At operation 716, the browser may update the web page to display the best fitting image in the placeholder. For example, the browser may continue or complete laying out the web page and may render the image in the placeholder.

Hence, by implementing the example flow of FIG. 7, a computing device may consume a web page that may be dynamically updated to display a best fitting image. In this way, instead of downloading an image that may be too large, the web page may enable the computing device to download an image that may have a large enough size. The web page may also avoid deterioration in the responsiveness because the downloaded image may be usable for display even when random changes to the display size may occur.

Turning to FIG. 8 that figure illustrates example code 802 and 806 that may be used in a web page. The code 802 may be associated with a placeholder for displaying an image. As illustrated, the code 802 may be updated to the code 806 based on a trigger event 804. The code 806 may cause a browser to display a best fitting image in the placeholder.

As illustrated, the code 802 may represent a <div> element 802A. The <div> element 802A may include a class 802B and attributes 802C. The class 802B may identify the placeholder. As such, when the browser executes a script (e.g., a JavaScript), the script may determine the association to the placeholder and may retrieve the corresponding size. The attributes 802C may identify various available images. For example, for each available image, the attributes 802C may list a URL and a size of the image.

When the trigger event 804 occurs, the script may update the code 802 to the code 806. The trigger event 804 may be implemented based on a right there and then approach. For example, when the browser brings the placeholder in view, the script may update the code 802 to the code 806. In another example, the trigger event may be implemented based on a before needed approach. In this example, before the browser displays the placeholder, the script may update the code 802 to the code 806.

The code 806 may represent a change to the code 802. For example, the script may change the <div> element 802A to an <img> element 806A. In addition, the script may select a best fitting image from the available images by comparing the image sizes to the placeholder size. Based on this selection, the script may set a source of the <img> element 806A to the corresponding URL 806B of the best fitting image. Optionally, the script may delete the remaining unnecessary attributes of the <div> element 802A. By using the <img> element 806A and the associated image source, the script may cause the browser to download the best fitting image using the URL 806B and to display the downloaded image in the placeholder.

Figure 9:
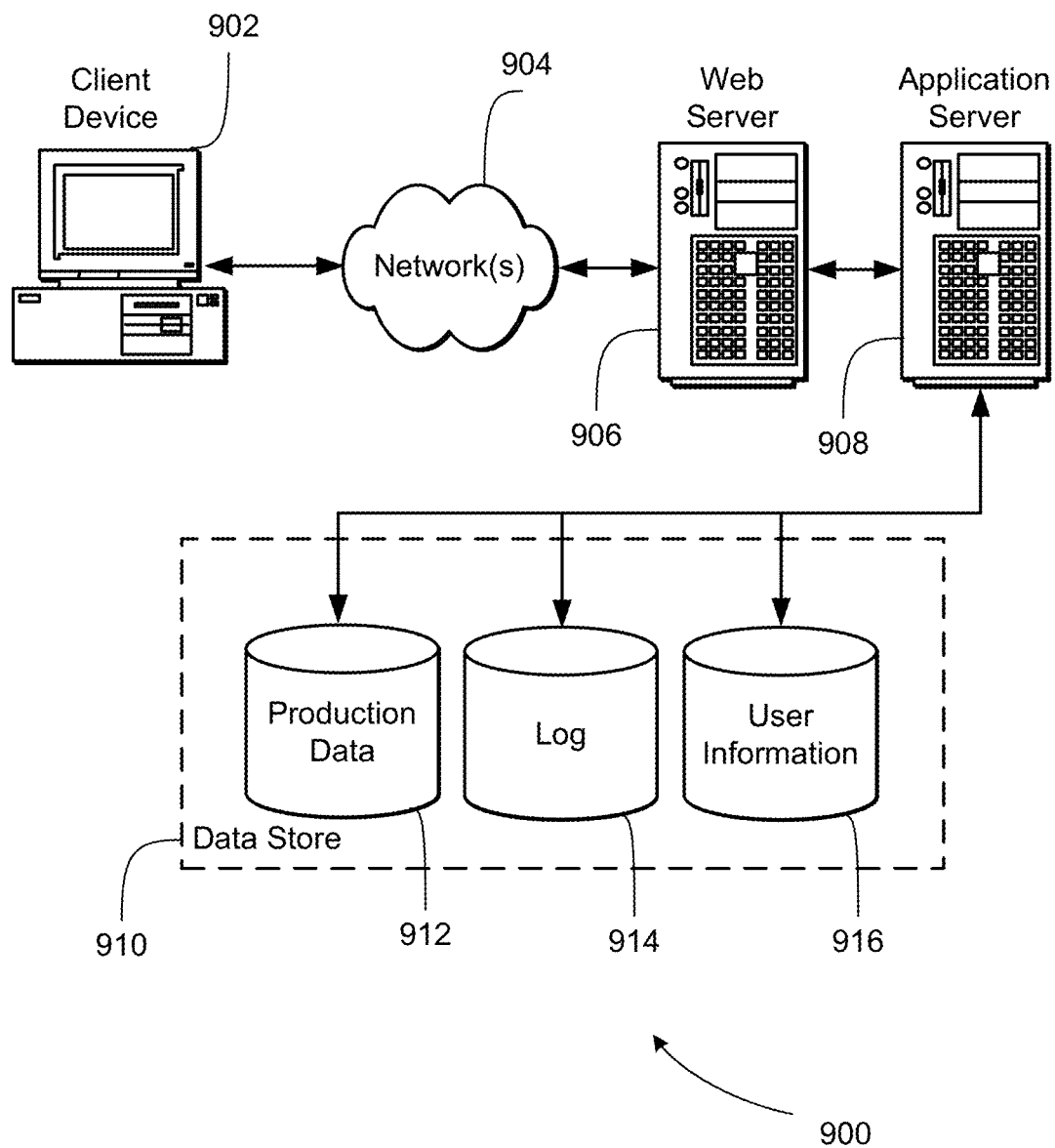
FIG. 9 illustrates an environment in which various embodiments can be implemented.

Turning to FIG. 9, that figure illustrates aspects of an example environment 900 capable of implementing the above-described structures and functions. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network(s) 904 and convey information back to a user of the device. Examples of such client devices include personal computers, cell phones, handheld messaging devices, laptop computers, set-top boxes, personal data assistants, electronic book readers, or any other computing device. The network(s) 904 can include any appropriate network, including an intranet, the Internet, a cellular network, a local area network or any other such network or combination thereof. Components used for such a system can depend at least in part upon the type of network or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of environment 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, or removable storage devices as well as storage media for temporarily or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    determining, by a computer system, a history of accessed network documents, the history indicating at least one of: computing device types, browser types, browser sizes, or placeholder sizes associated with the accessed network documents;
    determining, by the computer system based at least in part on the history, (i) a number of graphic components that can be rendered in a network document and (ii) a placeholder size range that can contain the graphic components in the network document;
    determining, by the computer system, size ranges of the graphic components based at least in part on the number and the placeholder size range;
    storing, by the computer system, the graphic components, the graphic components generated from one or more source graphic components according to the number and having sizes within the size ranges;
    generating, by the computer system, the network document, the network document comprising:
        a placeholder configured to hold a graphic component,
        a script configured to select the graphic component from the graphic components,
        identifiers of the graphic components, and
        the sizes of the graphic components;
    receiving, by the computer system from a computing device in association with a rendering of the network document on the computing device, a selection of the graphic component from the graphic components based at least in part on an execution of the script on the computing device, the selection based at least in part on a comparison by the script of a property of the placeholder to the sizes of the graphic components; and
    causing, by the computer system and based at least in part on the selection of the graphic component, the computing device to render the graphic component in the placeholder.

2. The computer-implemented method of claim 1, further comprising:
    storing, by the computer system, the graphic components in one or more storage locations, wherein the identifiers of the graphic components identify the one or more storage locations.

3. The computer-implemented method of claim 1, wherein the history comprises rendered sizes of placeholders in the accessed network documents.

4. The computer-implemented method of claim 1, wherein the number of the graphic components is based at least in part on factors that balance network bandwidth and network document responsiveness.

5. The computer-implemented method of claim 4, wherein the factors comprise the computing device types, the browser sizes, and the placeholder sizes.

6. The computer-implemented method of claim 1, wherein a total number of the graphic components is based at least in part on a pixel separation between the sizes of the graphic components, wherein the pixel separation is defined based at least in part on a likelihood of selection of another graphic component in response to a resizing of the placeholder.

7. The computer-implemented method of claim 1, wherein the script is configured to select the graphic component based at least in part on a size of the graphic components being a next largest size among the sizes of the graphic components in comparison to a size of the placeholder.

8. The computer-implemented method of claim 1, further comprising:
    providing the network document to the computing device based at least in part on a request of the computing device to access the network document, wherein prior to receiving the selection of the graphic component, the network document and the placeholder are rendered on the computing device without rendering the graphic component, and wherein the graphic component is rendered in the placeholder subsequent to the selection of the graphic component.

9. A system comprising:
one or more processors; and
one or more memories storing computer-readable instructions that, upon execution by the one or more processors, configure the system to:
  determine a history of accessed network documents, the history indicating at least one of: computing device types, browser types, browser sizes, or placeholder sizes associated with the accessed network documents;
  determine, based at least in part on the history, (i) a number of graphic components that can be rendered in a network document and (ii) a placeholder size range that can contain the graphic components in the network document;
  determine size ranges of the graphic components based at least in part on the number and the placeholder size range;
  store the graphic components, the graphic components generated from one or more source graphic components according to the number and having sizes within the size ranges;
  generate the network document, the network document comprising:
    a placeholder configured to hold a graphic component,
    a script configured to select the graphic component from the graphic components,
    identifiers of the graphic components, and
    the sizes of the graphic components;
  receive, from a computing device rendering the network document, a selection of the graphic component from the graphic components based at least in part on an execution of the script on the computing device, the selection based at least in part on a comparison by the script of a property of the placeholder to the sizes of the graphic components; and
  cause, based at least in part on the selection of the graphic component, the computing device to render the graphic component in the placeholder.

10. The system of claim 9, wherein the one or more memories store further instructions that, upon execution by the one or more processors, additionally configure the system to:
  receive, from a computing device in association with a rendering of the network document on the computing device, a selection of the graphic component from the graphic components based at least in part on an execution of the script on the computing device, the selection based at least in part on a comparison by the script of a property of the placeholder to the sizes of the graphic components.

11. The system of claim 10, wherein the one or more memories store additional instructions that, upon execution by the one or more processors, further configure the system to:
  send, to the computing device, the network document; and
  send, to the computing device, the graphic component based at least in part on the selection of the graphic component.

12. The system of claim 11, wherein the network document is sent prior to receiving the selection of the graphic component, and wherein the graphic component is sent after receiving the selection of the graphic component.

13. The system of claim 9, wherein a total number of the graphic components included in the network document is based at least in part on a pixel separation between the sizes of the graphic components, wherein the pixel separation is defined based at least in part on a likelihood of selection of another graphic component in response to a resizing of the placeholder.

14. The system of claim 9, wherein the network document identifies storage locations each corresponding to one of the graphic components, and wherein the identifier indicates a storage location of the graphic component.

15. The system of claim 9, wherein the network document is a web page, wherein the placeholder is associated with an element from a document object model of the web page, and wherein the size of the placeholder is determined based at least in part on the element and on a determination of whether the placeholder is already rendered on a computing device.

16. One or more non-transitory computer-readable storage media storing instructions that, upon execution on a system, cause the system to perform operations comprising:
  determining a history of accessed network documents, the history indicating at least one of: computing device types, browser types, browser sizes, or placeholder sizes associated with the accessed network documents;
  determining, based at least in part on the history, (i) a number of graphic components that can be rendered in a network document and (ii) a placeholder size range that can contain the graphic components in the network document;
  determining size ranges of the graphic components based at least in part on the number and the placeholder size range;
  storing the graphic components, the graphic components generated from one or more source graphic components according to the number and having sizes within the size ranges;
  generating the network document, the network document comprising:
    a placeholder configured to hold a graphic component,
    a script configured to select the graphic component from the graphic components,
    identifiers of the graphic components, and
    the sizes of the graphic components;
  receiving, from a computing device rendering the network document, a selection of the graphic component from the graphic components based at least in part on an execution of the script on the computing device, the selection based at least in part on a comparison by the script of a property of the placeholder to the sizes of the graphic components; and
  causing, based at least in part on the selection of the graphic component, the computing device to render the graphic component in the placeholder.

17. The one or more non-transitory computer-readable storage media of claim 16 storing further instructions that, upon execution on the system, cause the system to perform additional operations comprising:
  receiving, from a computing device in association with a rendering of the network document on the computing device, a selection of the graphic component from the graphic components based at least in part on an execution of the script on the computing device, the selection based at least in part on a comparison by the script of a property of the placeholder to the sizes of the graphic components.

18. The one or more non-transitory computer-readable storage media of claim 17 storing additional instructions that, upon execution on the system, cause the system to perform further operations comprising:
- sending, to the computing device, the network document; and
- sending, to the computing device, the graphic component based at least in part on the selection of the graphic component.

19. The one or more non-transitory computer-readable storage media of claim 18, wherein the network document is sent prior to receiving the selection of the graphic component, and wherein the graphic component is sent after receiving the selection of the graphic component.

20. The one or more non-transitory computer-readable storage media of claim 16, wherein a total number of the graphic components is based at least in part on a pixel separation between the sizes of the graphic components, wherein the pixel separation is defined based at least in part on a likelihood of selection of another graphic component in response to a resizing of the placeholder.

* * * * *